United States Patent
Zanchetta et al.

(10) Patent No.: US 7,317,045 B2
(45) Date of Patent: Jan. 8, 2008

(54) POLYETHYLENE MODIFIED ASPHALT COMPOSITIONS

(76) Inventors: Natalino Zanchetta, 4475 Mountain Gate Dr., Reno, NV (US) 89509; Michele Drigo, Via Borgo Fiune, Treviso (IT) 31100; Shaik Mohseen, 3 Diane Ct., Mountain Top, PA (US) 18707

( * ) Notice: Subject to any disclaimer, the term of this patent is extended or adjusted under 35 U.S.C. 154(b) by 0 days.

(21) Appl. No.: 11/220,741

(22) Filed: Sep. 6, 2005

(65) Prior Publication Data

US 2007/0054987 A1    Mar. 8, 2007

(51) Int. Cl.
*C08L 95/00*    (2006.01)
(52) U.S. Cl. ....................................................... 524/68
(58) Field of Classification Search .................. 524/68
See application file for complete search history.

(56) References Cited

U.S. PATENT DOCUMENTS

| | | | |
|---|---|---|---|
| 4,382,989 A | 5/1983 | Chang et al. | |
| 4,659,759 A | 4/1987 | Jevanoff et al. | |
| 4,829,109 A | 5/1989 | Ciaccia et al. | |
| 4,868,233 A | 9/1989 | Moran | |
| 4,891,272 A | 1/1990 | Ciaccia | |
| 4,987,166 A | 1/1991 | Jacono et al. | |
| 5,366,779 A * | 11/1994 | Thompson | 428/96 |
| 5,380,773 A | 1/1995 | Bellio et al. | |
| 5,558,703 A | 9/1996 | Bredael | |
| 5,807,911 A | 9/1998 | Drieskens et al. | |

FOREIGN PATENT DOCUMENTS

| | | | |
|---|---|---|---|
| EP | 0 667 374 | * | 1/1995 |
| GB | 2219802 | | 12/1989 |
| GB | 2223229 | | 4/1990 |
| IT | 19732A/88 | | 3/1988 |
| RU | 2 266 934 | | 12/2005 |
| SU | 1599220 | * | 10/1990 |

OTHER PUBLICATIONS

Abstract of European Patent No. EP0332245.
Full English language translation of RU 2 266 934, Dec. 27, 2005.
Full English language translation of SU 1599220, Dec. 29, 1987.

* cited by examiner

*Primary Examiner*—Peter Szekely
(74) *Attorney, Agent, or Firm*—Kenyon & Kenyon LLP

(57) ABSTRACT

A polymer modified bituminous composition for roofing applications that comprises polyethylene as the primary modifier.

22 Claims, No Drawings

POLYETHYLENE MODIFIED ASPHALT COMPOSITIONS

TECHNICAL FIELD OF THE INVENTION

This invention relates to bituminous roofing. More particularly, the present invention relates to modified asphalt composition for use in roofing materials.

BACKGROUND OF THE INVENTION

It is well known to use asphalt compositions to manufacture waterproofing materials, such as roofing membranes, shingles or underlayments. The purpose of such materials is to offer protection against the elements. Because of its good weatherability and hydrophobic nature, asphalt has been used in waterproofing applications for several centuries.

Roofing materials must possess key mechanical and chemical characteristics, such as pliability, resistance to cracking at low temperatures, high puncture resistance, good strength and elongation (to withstand stresses and potential building movements), resistance to flow at elevated temperatures, and thermal and dimensional stability, etc. Most importantly, a roofing material must have minimal susceptibility to the effects of temperature. It is also desirable that such properties be maintained even after exposure to natural elements, e.g. sunlight, condensation, airborne contaminants, etc., and foot traffic.

It is well known that asphalt by itself does not possess all these essential properties. For example, asphalt undergoes stiffening at low temperatures, which makes it fragile in cold weather temperatures even to light impacts. At high temperatures, instead, the viscosity of asphalt is so low that it flows spontaneously or becomes permanently deformed under minimal mechanical stress. To overcome these problems, modifiers have been added to the asphalt in order to obtain an asphalt composition having more suitable physical and mechanical properties. Polymers commonly used to modify asphalt include amorphous or atactic polypropylene (APP), amorphous polyalphaolefin (APAO), thermoplastic polyolefin (TPO), styrene-butadiene-styrene (SBS), styrene-ethylene-butadiene-styrene (SEBS), synthetic rubber or other asphaltic modifiers that enhance the properties of asphalt. The incorporation of such modifiers into the asphalt widens its workable temperature range for roofing applications and results in improved mechanical and viscoelastic properties. Some of the main reasons for modifying asphalt with polymers are to obtain greater resistance to flow at high temperatures, improved resistance to cracking at low temperatures, high dimensional stability over a wide temperature range, improved durability, and resistance to weathering caused by exposure to the elements.

In the middle of the $20^{th}$ century, an innovative roofing system utilizing modified asphalt was introduced in the market. This type of roofing system is generally referred to as "modified bituminous roofing," or "modified asphalt roofing membrane" and eliminates the need for several layers of roofing sheets to be installed on the rooftop. Such roofing materials are comprised of a core that is saturated and coated with modified asphalt. The core is typically a reinforcing carrier made of fabric such as polyester, fiberglass, or a combination of both. The asphalt modifiers typically include atactic polypropylene (APP), amorphous polyalphaolefin (APAO), thermoplastic polyolefin (TPO), styrene-butadiene-styrene (SBS), styrene-ethylene-butadiene-styrene (SEBS), synthetic rubber or other asphaltic modifiers that enhance the properties of asphalt.

The modified bituminous roofing materials described above are used in commercial, industrial and residential applications. Two major classifications of such materials, that are used mostly in industrial and commercial applications are (1) cap sheet and (2) base sheet. The cap sheet takes its name from the fact that its top surface is exposed to the elements. Because their top surface is also exposed to the elements, shingle roofing materials, which are used primarily in residential applications, can also be considered "cap" materials. Both cap sheets and shingles can be manufactured using asphalt modified with APP, APAO, TPO, SBS, SEBS, synthetic rubber or other asphaltic modifiers, and are generally reinforced with a polyester carrier or a combination of polyester and fiberglass. They can be smooth or granular surfaced and are typically greater than 2.8 mm in thickness. Base sheets are typically modified using any of the same modifiers as a cap sheet. Because the base sheet is not intended to be exposed to the elements, the asphalt component is typically modified using less expensive polymers such as APP, or with smaller quantities of polymers such as SBS. The base sheet is typically reinforced with a fiberglass carrier, which is significantly less expensive than polyester. It is smooth surfaced and typically between 1.0 mm to 2.5 mm thick depending upon the job specifications.

In a typical field installation, a base sheet is first applied to the roof deck using mechanical fasteners, hot mopping or cold application techniques. Cap sheets or shingles are applied on top of the base sheets, with the seams of adjacent rolls in offset relation. Underlayments, which are typically reinforced with fiberglass, but can also have no carrier are more commonly used under shingles. Most APP modified asphaltic membranes are torch applied by heating the back side of the sheet to melt the compound and using the molten compound to form a heat weld. Most SBS modified asphaltic membranes are set by hot mopping, torch-application or adhesion using cold-process adhesives as described in U.S. Pat. No. 5,807,911, to Wentz, et al.

SBS is one of the most commonly used asphalt modifiers. It is a made-on-purpose polymer that is widely used in several applications such as in the manufacture of shoes. SBS-modified asphaltic blends have improved low temperature flexibility, pliability and elongation properties. However, blends containing SBS as the only modifier also have disadvantages. For example, they tend to be soft and thus difficult to install during warm weather. They have poor resistance to ultraviolet light from the sun, and thus need to be protected with a coating or mineral granules on the upper surface. Furthermore, SBS's unique molecular structure makes processing SBS polymer difficult, and consequently manufacturing an SBS-asphalt compound requires special mixing equipment.

APP is another commonly used modifier in asphalt blends. It is a by-product in the production of isotactic or crystalline polypropylene (IPP). Because of its low cost and excellent characteristics in modifying asphalt, it has been used for asphalt modification for over forty years. APP modified asphalt blends have higher resistance at elevated temperatures than SBS modified asphalt blends, improved low temperature properties, good heat aging and long-term weatherability characteristics, and excellent walkability on warm days. APP modified asphalt compounds also possess better ultraviolet resistance than their SBS counterparts. Asphalt modified with only APP, however, does not have enough hardness, and is susceptible to deformation under minimal mechanical force, especially at high temperatures. Thus when modifying asphalt, APP modifiers are usually used in conjunction with other ingredients such as ethylene-propylene copolymer and IPP. Addition of IPP to an APP-asphalt blend imparts hardness and rigidity to the blend. Incorporation of ethylene-propylene copolymer improves its low temperature flexibility. Depending upon the type of asphalt and the desired final properties, varying proportions of the different modifiers are added to asphalt.

Of the two general types of asphaltic sheet materials used for roofing applications, i.e., APP modified or SBS modified, the SBS based products are more elastic, and have greater flexibility at low temperatures. APP based products, on the other hand, are more resistant to heat (due to a higher softening point), atmospheric effects (especially ultra-violet rays), and foot traffic.

The cost of polymeric modifiers is the highest of all ingredients in the asphalt formulation and therefore has a significant effect on the total cost of the formulation. In order to reduce costs, attempts have been made to include cheaper materials as modifiers, for example, polyethylene. Attempts to use polyethylene as a modifier, however, have been limited to using low density polyethylene as the primary modifier or using it in conjunction with other modifiers such as APP, IPP and ethylene propylene copolymer in the formulation. The primary purpose of such attempts was to replace more expensive and scarcer raw materials such as APP. While APP was originally the unwanted by-product of crystalline polypropylene synthesis, it is becoming increasingly scarce because processes for making IPP have been improved to the point where production of by-product APP is negligible. Despite these attempts and the need to find lower cost materials, to the best of the applicants' knowledge, no modified asphalt roofing membranes composed of asphalt modified with polyethylene as the primary modifier have yet been marketed. There is therefore a need for a polyethylene-based modified asphalt composition which has properties that are ideally suited for modified asphalt roofing systems.

SUMMARY OF THE INVENTION

The present invention provides novel asphalt compositions for use in roofing applications that utilize polyethylene (virgin or recycled) as the primary or sole asphalt modifier. It has been discovered that by using a blend of low and high density polyethylene and/or a plasticiser, ethylene modified asphalt formulations can be obtained which have surprisingly good characteristics for modified asphalt roofing membrane applications. The formulations of the present invention surprisingly have improved mechanical, chemical and rheological properties compared to asphalts modified with conventionally used polymers such as APP, APAO, or SBS. They are also characterized by enhanced processability during manufacture as well as ease of application during field installation. In particular the formulations of the present invention possess high temperature resistance, good long-term weatherability characteristics, and excellent durability. Furthermore the formulations of the present invention can be formulated so as to be very "hard", and thus ideally suited for application in warm weather conditions, or very "flexible", and thus, ideally suited for application in cold weather conditions. The formulations are also advantageous because they offer significant cost savings in comparison to the typical APP, APAO or SBS modified asphalt. The ethylene is not only cheaper than these other modifiers, but also surprisingly less can be used in the formulation of the invention. This leads to enhanced cost savings. In the preferred embodiments, 10% or less of polymer can be used, whereas in membranes modified with conventional polymeric modifiers, the polymer content is typically 15% or more.

Further aspects, objects, features and advantages of the present invention will become apparent to those of ordinary skill in the art upon reading and understanding the following detailed description and preferred embodiments, and when read in light of the accompanying examples.

DETAILED DESCRIPTION AND PREFERRED EMBODIMENTS OF THE INVENTION

As discussed in the earlier sections, the widely employed approach to modify the physical, chemical and rheological properties of asphalt for use in roofing materials is to incorporate certain modifiers, including APP, APAO, TPO, SBS, SEBS, and synthetic rubber. Of these, the most popular are APP, and SBS.

The present invention is a novel asphalt formulation for use in manufacturing roofing membranes which includes polyethylene as the principal modifier. Polyethylene-asphalt roofing blends are not commercially available because compatibility between polyethylene and asphalt is notoriously difficult to achieve. Compatibility between asphalt and polymers is important to ensure stability of the blend and obtain the desired performance. In fact, SBS must be used with certain types of asphalt to avoid phase separation. However, whereas SBS-based blends may have improved low temperature flexibility and elasticity, they do not have as good UV resistance as APP-modified blends.

It has now been surprisingly found that the use of low density polyethylene ("LDPE") and high density polyethylene ("HDPE"), in defined ratios ranging from 4:1 to 1:4 LDPE/HDPE by weight, depending on the application, as the principal polymeric modifier in an asphalt composition results in properties not only equal to, but also superior to modified asphalt compositions of the prior art. The PE based compositions of the invention not only have excellent low temperature flexibility and elasticity, but also good UV resistance and higher resistance at elevated temperatures. It has further surprisingly been found that the addition of a plastification agent, such as an aromatic oil, to a polyethylene-asphalt blend improves the phase compatibility between asphalt and polyethylene so that a commercially useful blend with excellent characteristics for roofing results. Such blends exhibit good performance at low temperatures as well as high temperature conditions and are therefore well suited for roofing applications. In particular, the polyethylene modified asphalt compositions of the present invention have improved long-term properties, such as improved low temperature flexibility and elasticity after aging, and offer significant cost savings compared to the conventional APP or SBS asphalt formulations of the prior art.

In one embodiment of the invention, the composition comprises between about 1 and 20 percent by weight of polyethylene, about 5 and 50 percent by weight of filler, 1 to 10 percent by weight of one or more plastification agents, and the remaining portion asphalt. Preferably the polyethylene-asphalt composition of this embodiment includes between 5 and 15 percent by weight of polyethylene, between 5 and 50 percent by weight of filler, between 3 and 6 percent by weight of plastification agents, and between 40 and 70 percent by weight of asphalt. Most preferably, the polyethylene-asphalt blend of this embodiment comprises 5 to 10 percent by weight of polyethylene, 20 to 35 percent by weight of filler, 4 to 5 percent by weight of plastification agents, and 50 to 65 percent by weight of asphalt. Fire retardant materials can be used as fillers in order to produce a polyethylene-asphalt blend having fire retardant properties.

In another embodiment, the polyethylene comprises high density polyethylene and low density polyethylene in a ratio that ranges from about 4:1 to 1:4 LDPE/HDPE by weight, depending on the desired hardness of the composition. The harder the desired composition, the higher the HDPE component. The asphalt composition of this embodiment optionally further includes one or more plastification agents. Preferably the polyethylene-asphalt composition of this embodiment includes between about 1 and 20 percent by weight of polyethylene, about 5 and 50 percent by weight of filler, optionally about 1 to 10 percent of a plastification agent, and the remaining portion asphalt. If a plastification agent is used, the composition of the present invention preferably comprises between about 5 and 15 percent by weight of polyethylene, between about 5 and 50 percent by weight of filler, between about 3 and 6 percent by weight of plastification agents, and between about 40 and 70 percent by weight of asphalt. Most preferably, the polyethylene-asphalt blend of this embodiment comprises about 5 to 10 percent by weight of polyethylene, about 20 to 35 percent by weight of filler, about 4 to 5 percent by weight of plastification agent, and about 50 to 65 percent by weight of asphalt. Fire retardant materials can be used as fillers in order to produce a polyethylene-asphalt blend having fire retardant properties. A particularly preferred roofing asphalt formulation includes about 10 percent by weight of polyethylene, about 4 percent by weight of plastification agents, about 31 percent by weight of filler, and about 55 percent by weight of asphalt.

Asphalts are usually classified according to their geographic origins, such as Arabian, Venezuelan, Canadian, Rocky Mountain, Mid-Continent crude, and their properties vary based on the crude source. Asphalt can be either a product of refining of crude oil or a naturally occurring substance, asphalt used in this formulation is obtained during the process of distillation of petroleum. The asphalt preferably used in the manufacture of roofing shingles is normally "oxidized". Oxidation is done by the introduction of air, i.e. oxygen, into asphalt and heating the same, and this process of oxidation makes the asphalt hard. Such hard asphalt is preferred for the manufacture of roofing shingles and underlayments, and may contain filler. However asphalt to be used in the membranes of the present invention is preferably not oxidized and does not contain any filler.

The characteristics of the modified asphalt blend vary dramatically depending upon the source of crude from which the particular type of asphalt is derived. Hence it is essential to analyze the chemistry of the asphalt to determine saturates and asphaltene levels. Asphalt preferably used in the formulations of the present invention has the properties described in Table I, below.

TABLE I

PHYSICAL PROPERTIES OF ASPHALT

| Properties | Unit | Values |
|---|---|---|
| Viscosity @ 180 degrees C. | cP | 30-300 |
| Boiling point | ° C. | >350 |
| Softening point | ° C. | >35 |
| Flash point | ° C. | >475 |
| Needle penetration at 60 deg C., 100 g/5 sec | dmm | 50-200 |

Preferred asphalt for this application is referred to in the art as "roofing flux". Commonly used asphalts of this type are RF-140, PG 52-28, PG 70-22 (where "RF" refers to "roofing flux", "PG" refers to "pavement grade", the numerical designation "140" refers to the target needle penetration value, and "52-28" indicates the workable temperature range of the asphalt). The asphalt employed in the present invention may be obtained from various refineries. Some of the sources of asphalt used in this invention are Valero Refining Company of San Antonio, Tex., United Refining Company of Erie, Pa., and Foreland Refining Corporation of Salt Lake City, Utah.

The polyethylene used in formulations of the present invention may be low density polyethylene (LDPE), high density polyethylene (HDPE), and preferably a combination thereof. Linear polyethylenes are preferred. Linear polyethylenes are formed in the presence of a catalyst and have minimal branching of carbon chains having more than ten carbon atoms.

The preferred polyethylene for use in the present polyethylene modified asphalt blends has a weight average molecular weight of between 1,000 and 25,000, a melt flow index value between about 5 and 100, preferably about 5-50 and most preferably about 18-22, and can come in the form of powder, granules or bales. Polyethylene may be low, medium or high density, as characterized in the Table II below.

TABLE II

POLYETHYLENE DENSITIES

| Density Type | Unit | Density |
|---|---|---|
| Low Density Polyethylene | $g/cm^3$ | less than 0.915 |
| Medium Density Polyethylene | $g/cm^3$ | 0.915-0.950 |
| High Density Polyethylene | $g/cm^3$ | greater than 0.950 |

Preferred low density polyethylene is less than about 0.950 $g/cm^3$, preferably less than 0.930 and most preferably less than about 0.915 $g/cm^3$, Preferred high density polyethylene most preferably has a melt flow index of about 2 to 20. Polyethylene employed in the polyethylene-modified asphalt blends of the present invention may be virgin or recycled material. Of course the use of recycled material offers significant cost savings. Whereas virgin polyethylene may be procured from a variety of manufacturers of polyethylene, recycled polyethylene may be obtained from companies that specialize in recycled plastics. A list of such companies may be obtained from local governmental agencies in charge of recycling programs. A few sources of recycled plastics are Ravago Plastics of Houston, Tex., The Matrixx Co. of Houston, Tex., First State Recycling Company of Wilmington, Del., Agri-Plas of Portland, Oreg., and SJC Limited of Fernley, Nev.

Where a mixture of low density and high density polyethylene is used in a formulation of the invention, the preferred ratio between the different density polyethylene components depends upon the chemistry of the base asphalt and the desired characteristics of the resultant blend. For example low density polyethylene (LDPE) tends to lower softening point, but imparts greater flexibility to the blend, whereas high density polyethylene (HDPE) tends to increase the softening point. Addition of high levels of high density polyethylene (HDPE) also affects the flexibility or elasticity of the mix, owing to its crystalline morphology. Depending upon the desired results, which vary from summer to winter months, varying proportions of the two polyolefins may be employed. Thus, the formulations may be adjusted to account for seasonal temperature fluctuations simply by adjusting the ratio between the high and low density polyethylene. Furthermore the amount of plasticiser may be varied or the plasticiser may be omitted altogether. Thus, for example, in order to get a "hard" compound, which is more suitable for roofing materials to be installed at warm temperatures, the ratio of high to low density polyethylene is increased. In order to get a "soft" compound, which is more suitable for roofing materials to be installed at cold temperatures, the ratio of high to low density polyethylene is decreased. The preferred ratio of LDPE to HDPE for a blend used in a membrane to be applied in warm weather is 1: 1. The preferred ratio of LDPE to HDPE for a blend used in a membrane to be applied in cold weather is 4:1. The higher the ratio of HDPE to LDPE, the greater the amount of plasticiser needed, if used. Furthermore, because the plasticiser tends to reduce hardness, it is advantageous to omit it from formulations used in roofing materials to be installed at warm temperatures.

Greater or lesser amounts of filler may be used; though the quantity of filler used affects the viscosity and the final mix cost. The filler used in the embodiments enumerated above is selected from the group consisting of limestone, talc, fly ash, volcanic ash, graphite, carbon black, silica, stone dust or china clay. Addition of filler material has numerous advantages such as reducing the overall cost of the asphalt-polymer blend, improving fire resistant properties, and increasing the resistance to weather. Additionally, in order to achieve fire ratings as classified by Underwriters' Laboratories (UL), special fire retardant additives may be used as filler material. Typical fire retardants employed include calcium borate, magnesium borate, a mixture of antimony tri-oxide and deca bromo diphenyl oxide, etc. These are used as replacement for existing filler material such as limestone, talc, fly ash, volcanic ash, graphite, carbon black, silica, stone dust or china clay or in conjunction with these materials. A minimum of 10 percent of the fire retardant material is preferred to achieve the desired performance during fire testing.

Plastification agents are preferably aromatic oils that are available from oil refineries around the country. It is preferable that such oil has a level of 'aromatic' content sufficient to achieve good compatibility with asphalt. Preferably the plastification agent is a linear or branched alkylphenol, most preferably the oil is a linear alkylphenol. Such oils are commercially available. The plastification agent may be added separately to asphalt (before other modifiers are added) or alternately it may be added at the time of preparation of the asphalt-polymer blend.

Asphalt-polymer blends may be prepared in any number of ways known to those skilled in the art. Some of the methods of mixing include Banbury mixers, screw extruders, auger mixers, etc. During the process of mixing, the various ingredients are mixed with asphalt at temperatures higher than the melting point of the additives such that the polymers will melt and is said to form a cross-linked network with asphalt. It is this cross-linked network that imparts the desired characteristics to asphalt. Mixing times can vary from 3 hours to 6 hours, depending upon the size and shape of the additives, mixing temperature, mixing speed, method of addition of the resins, etc. The conditions at which polyethylene is blended with asphalt is important and affects the final properties. Typically, mixing of the polyethylene in asphalt is done at ambient pressure and at a temperature between 150° C. and 240° C. Preferably temperature range of mixing is between 180° C. and 210° C. Use of polyethylene in liquid form improves the efficiency of the mixing process. A laboratory batch may be prepared in a steel container, by mixing the right quantities of the various ingredients with asphalt at temperature between 180° C. and 210° C., and by mixing using a blade stirrer at speeds varying from 400 rpm to 1000 rpm for 3 hours to 6 hours. A master batch may be prepared by incorporating all the ingredients in an external mixer and mixing at temperatures ranging from 180° C. and 210° C. for 4 hours to 6 hours.

EXAMPLE I

Examples of preferred embodiments of the inventive formulation appear in Table III below. The LDPE used in these examples has a density of less than 0.93 g/cm$^3$ and the HDPE used in these examples has a melt flow index of 7.

TABLE III

| Ingredients | Unit | Warm application blend | Cold application blend |
|---|---|---|---|
| Low density polyethylene | % | 5.0 | 6.0 |
| High density polyethylene | % | 5.0 | 1.5 |
| Plastification Agent | % | 0 | 2.5 |
| Filler | % | 35.0 | 35.0 |
| Asphalt | % | 55.0 | 55.0 |

The formulation is prepared by loading all the ingredients in an external mixer and mixing the resultant mixture at temperatures ranging from 180° C. and 210° C. for 4 hours to 6 hours. The resultant formulation should have a viscosity between 2,000 and 20,000 cP at 180° C., a softening point temperature greater than 120° C., and a needle penetration value of greater than 100 dmm at 60° C.

Various tests were conducted on the polyethylene modified asphaltic blends described in Table II using ASTM test methods and standards commonly used in the art to determine suitability for roofing applications. The results are summarized in Table IV, below. An explanation of the properties measured follows.

TABLE IV

| Properties | Unit | Warm application blend | Cold application blend |
|---|---|---|---|
| Phase compatibility | visual | very good | very good |
| Viscosity @ 180° C. | cP | 7000 | 4500 |
| Softening point | ° C. | 125 | 120 |
| Penetration @ 60 degrees C. | dmm | 70 | 120 |
| Low temperature flexibility | ° C. | −5 | −5 |
| Heat stability | ° C. | 120 | 120 |
| Low temp. flexibility after heat aging | ° C. | +5 | −5 |
| Cost of mix per lb | US$ | 0.053 | 0.0725 |

Phase compatibility is an essential property because it is an indication of the long-term performance of the blend. Phase compatibility, also referred to as "networking", affects other key mix characteristics such as viscosity, softening point, penetration, low temperature flexibility, heat-stability and long term heat aging. Phase compatibility is usually assessed by taking small samples of the blend, forming it into a thin film on a microscope slide and observing the dispersion of the polymers in the asphalt under a microscope at 250 magnification. This visual observation under the microscope is usually compared to a chart containing photographs of films showing gradations of phase compatibility, ranging from, for example, good to poor. Typically each roofing manufacturer has its own chart, however what is considered good and poor is generally consistent within the industry.

Viscosity is a measure of the flow characteristics of a material. Viscosity of the modified asphaltic blend is essential to ensure ease of processing during the process of saturating and coating the reinforcement with the asphaltic blend. A viscosity that is too high may result in stretching and cause wrinkles on the reinforcing fabric. A viscosity that is too low may make it difficult to achieve the desired thickness of the final membrane because the blend may flow readily. Viscosity is also a factor during field installation of the roofing membrane. For example, in the case of torch-applied membranes, it may be difficult to achieve a good flow of asphalt from membrane manufactured using a high viscosity blend. Conversely membranes consisting of low viscosity blends may flow too readily and may be too "soft" to walk on during roof installation. Hence it is important that an optimum viscosity be maintained. Optimal viscosity ranges depend on the materials and the processing conditions at the production facility. However, those of ordinary skill in the art are very familiar with optimal viscosity ranges associated with different blends for particular uses and types of roofing materials. Generally, however, the viscosity must be between 2,000 and 20,000 cps. The most commonly used measure of viscosity is known as "Brookfield viscosity", which is obtained using a Brookfield viscometer. It is a measure of the flow characteristics of a material and is expressed in centipoise. The viscosity is determined usually at the temperature at which the blend will be processed in the manufacturing line.

Softening point is the temperature at which the blend reaches a state at which it begins to flow. This parameter is important factor during field installation of the roofing membrane. For example, in the case of torch-applied membranes, if the blend used to manufacture the membrane has a softening point that is too high, it may be difficult to achieve a good flow of asphalt during installation. Conversely, if the blend used to manufacture the membrane has a softening point which is too low, it may flow too readily and may be too "soft" to walk on. Hence it is important that the blend have a an optimum softening point for the temperature range during which the membrane will be installed. Thus this parameter must be adjusted to accommodate different seasons or climates. Softening point is determined by the "ring and ball" test method in accordance with ASTM D-36, and is expressed in ° C. Optimal softening point ranges depend on the materials and the processing conditions at the particular plant. However, those of ordinary skill in the art are familiar with optimal softening point ranges associated with different blends for particular uses and types of roofing materials. Generally, the softening point must be between about 110 and 160° C.

Needle penetration is an indication of the softness or hardness of the material. It is also an important factor during field installation of the roofing membrane. For example, a mix that is too soft may cause problems associated with "treading" and result in footprints being left on the membrane surface in warm climates. A blend that is too hard may crack in cold climates. This parameter is also adjusted by those of ordinary skill in the art to accommodate diverse climates and the seasons. This test is conducted in accordance with ASTM D-5 test method, where a sample is conditioned in a water bath maintained at 60° C. subjected to needle penetration under a weight of 100 grams for five seconds. The depth the needle travels in those five seconds is used as the measure of hardness or softness of the blend. It is expressed in dmm (decimillimeter). The optimal needle penetration ranges depend on the materials and the applications (e.g. how the roofer uses the product). However, those of ordinary skill in the art are familiar with optimal needle penetration ranges associated with different blends for particular uses and types of roofing materials. Generally, the needle penetration at 60° C. should be between 40 and 150 dmm.

Low temperature flexibility is a measure of the ability of the blend to resist cracking at low temperatures. This parameter is very important because it is a measure of how well and for how long the roofing membrane will perform. It is very important that membranes have good low temperature flexibility, especially during cold weather conditions. To determine low temperature flexibility, samples of the blend are conditioned in a freezer at a constant temperature for 1 to 2 hours, and then bent over a mandrel of a particular diameter over a time period of usually 5 seconds. The sample is then visually observed for signs of cracking. If the sample does not exhibit any signs of cracking, testing is continued at lower temperatures until signs of cracking are visible. Low temperature flexibility is also determined after heat conditioning the samples in a convection oven maintained at 70 degrees C. for 90 days in order to determine the low temperature flexibility after aging or heat aged cold flexibility. This parameter is important for membranes that will be subjected to extremes in temperature.

Heat stability is a measure of the dimensional stability of the blend at high temperatures. It is directly related to the softening point. Where the softening point is measured on the blend, the heat stability is measured on the final product. Dimensional stability is a measure of how well the membrane retains its dimension and shape. This test is conducted by vertically hanging samples of the blend in a convection oven at different temperatures and observing at what temperature any dripping or flowing of asphalt occurs.

COMPARATIVE EXAMPLE

The present invention will be further understood and appreciated by reference to the following example of conventional APP modified asphalt blend formulations. The composition of the blends is described in Table V. They are prepared in the same method as the polyethylene-modified asphalt blends described in Table III.

TABLE V

| Ingredients | Unit | Warm application blend | Cold application blend |
|---|---|---|---|
| Atactic polypropylene | % | 5.0 | 6.0 |
| Isotactic polypropylene | % | 5.0 | 2.0 |
| Copolymer | % | 5.0 | 7.0 |
| Filler | % | 35.0 | 35.0 |
| Asphalt | % | 50.0 | 50.0 |

The compositions shown in Table V are typical APP modified asphaltic formulations used in roofing applications. APP used is commercially available material such as Adflex from Basell Company. IPP employed is a recycled material from First State Recycling Company of Wilmington, Del. Copolymer utilized was an ethylene-propylene copolymer, Vestoplast 891, obtained from Degussa GmbH of Germany. Such a mix typically has good dispersion, a viscosity of 2,000 to 10,000 cP at 180° C., softening point greater than 120° C., and needle penetration value of greater than 50 dmm at 60° C. Results of typical parameters are given in Table VI.

TABLE VI

| Properties | Unit | Warm application blend | Cold application blend |
|---|---|---|---|
| Phase compatibility | visual | very good | very good |
| Viscosity @ 180° C. | cP | 4500 | 3000 |
| Softening point | ° C. | 140 | 140 |
| Penetration @ 60 degrees C. | dmm | 50 | 120 |
| Low temperature flexibility | ° C. | −5 | −10 |
| Heat stability | ° C. | 140 | 140 |
| Low temp. flexibility after heat aging | ° C. | +10 | +5 |
| Cost of mix per lb | US$ | 0.099 | 0.113 |

The data in Tables IV and VI shows that the formulations of the invention are comparable to the conventional APP modified formulations in many respects. The heat stability and softening point of the blends of the invention, while lower than those of the conventional blends, are more than adequate for most roofing purposes. Furthermore, the formulations of the present invention are a significant improvement over comparable conventional polypropylene formulations with respect to low temperature flexibility after heat aging. As discussed above, this is a very important parameter because it assesses the durability and long term performance of the membrane. As can be seen from the data, the warm application blend of the invention and the corresponding polypropylene blend had a low temperature flexibility of −5° C. After heat aging, the warm application blend of the invention had a low temperature flexibility of +5° C., whereas the corresponding value for the conventional blend was +10° C. Furthermore, while the low temperature flexibility of the cold application blend of the invention, before heat aging, was −5° C. versus −10° C. for the corresponding value for the conventional APP cold application blend, the cold application blend of the invention after heat aging had a low temperature flexibility of −5° C., which is ten degrees lower than the corresponding value observed for the conventional APP cold application blend.

In addition, the formulations of the present invention provide significant cost savings due both to the lower cost and lower quantity of the polymer. As can be seen when comparing Tables IV and VI, the cost of the warm application blend of the invention is about 45% lower than the cost of the corresponding conventional blend, and the cost of the cold application blend of the invention is about 35% lower than the cost of the corresponding conventional blend. Furthermore, the blends of the invention also offer greater ease of processing because fewer resins must be added to the asphalt.

What is claimed is:

1. A modified bitumen composition for roofing application comprising:
   a polymer modifier consisting essentially of polyethylene; and
   asphalt, wherein the polyethylene consists of a mixture of high density polyethylene and low density polyethylene in a ratio ranging from about 4:1 to 1:4 LDPE to HDPE by weight, wherein the polyethlene is linear.

2. The composition of claim 1, wherein the polyethylene has a weight average molecular weight between about 1,000 and 25,000.

3. The composition of claim 1, wherein the polyethylene has a melt flow index value between about 5 and 50.

4. The composition of claim 1, wherein the low density polyethylene has a density less than 0.95 g/cm$^3$.

5. The composition of claim 1, wherein the low density polyethylene has a density ranging less than 0.93 g/cm$^3$.

6. The composition of claim 1, wherein the low density polyethylene has a density ranging less than about about 0.915 g/cm$^3$ and the high density polyethylene has a melt flow index ranging from 2 to 20.

7. The composition of claim 1, further comprising at least one plastification agent.

8. A modified bitumen composition for roofing application comprising:
   a polymer modifier consisting essentially of polyethylene;
   at least one plastification agent; and
   asphalt,
   wherein the polyethylene consists of a mixture of high density polyethylene and low density polyethylene in a ratio ranging from about 4:1 to 1:4 LDPE to HDPE by weight, and wherein said composition comprises:
   a. about 1 to 20 percent by weight of polyethylene,
   b. about 1 to 10 percent by weight of a plastification agent,
   c. about 5 to 50 percent by weight of filler, and
   d. remaining portion of asphalt.

9. The composition of claim 8, comprising:
   a. between about 5 to 15 percent by weight of polyethylene,
   b. between about 3 to 6 percent by weight of plastification agents,
   c. between 5 and 50 percent by weight of filler, and
   d. between 40 and 70 percent by weight of asphalt.

10. The composition of claim 9, comprising:
    a. about 5 to 10 percent by weight of polyethylene,
    b. about 20 to 35 percent by weight of filler,
    c. about 4 to 5 percent by weight of plastification agent, and
    d. about 50 to 65 percent by weight of asphalt.

11. The composition of claim 10, comprising:
    a. about 10 percent by weight of polyethylene,
    b. about 4 percent by weight of plastification agent.

12. The composition of claim 1, comprising:
    a. about 5 percent by weight of low density polyethylene;
    b. about 5 percent by weight of high density polyethylene.

13. The composition of claim 7, comprising:
    a. about 6 percent by weight of low density polyethylene;
    b. about 1.5 percent by weight of high density polyethylene;
    c. about 2.5 percent by weight of plastification agent.

14. A modified bitumen composition for roofing application comprising:
    a polymer modifier consisting essentially of polyethylene;
    one or more plastification agents;
    and asphalt, wherein the polyethylene is linear.

15. The composition of claim 14, wherein the polyethylene consists of a mixture of high density polyethylene and low density polyethylene in a ratio ranging from 1:4 to 4:1 LDPE to HDPE by weight.

16. The composition of claim 14, wherein the polyethylene has a weight average molecular weight between 1,000 and 25,000.

17. The composition of claim 14, wherein the polyethylene has a melt flow index value between 5 and 50.

18. The composition of claim 14, wherein the low density polyethylene has a density less than 0.95 g/cm$^3$.

19. The composition of claim 14, wherein the low density polyethylene has a density less than 0.93 g/cm$^3$.

20. The composition of claim 14, wherein the low density polyethylene has a density ranging less than about about 0.915 g/cm$^3$ and the high density polyethylene has a melt flow index ranging from 2 to 20.

21. The composition of claim 14, wherein the low density polyethylene has a density ranging less than 0.91 and the high density polyethylene has a melt flow index ranging from 2 to 20.

22. The composition of claim 14, comprising:
  a. about 7.5 percent by weight of polyethylene, and about 2.5 percent by weight of plastification agent.

* * * * *